(12) United States Patent
Franca-Neto et al.

(10) Patent No.: US 8,085,490 B2
(45) Date of Patent: Dec. 27, 2011

(54) SLIDER FLY-HEIGHT CONTROL IN A HARD DISK DRIVE

(75) Inventors: Luiz M. Franca-Neto, Sunnyvale, CA (US); Bernhard E. Knigge, San Jose, CA (US); Stefan Maat, San Jose, CA (US)

(73) Assignee: Hitachi Global Storage Technologies, Netherlands B.V., Amsterdam (DE)

( * ) Notice: Subject to any disclaimer, the term of this patent is extended or adjusted under 35 U.S.C. 154(b) by 6 days.

(21) Appl. No.: 12/646,848

(22) Filed: Dec. 23, 2009

(65) Prior Publication Data

US 2011/0149428 A1 Jun. 23, 2011

(51) Int. Cl.
*G11B 21/02* (2006.01)

(52) U.S. Cl. ......................................... 360/75

(58) Field of Classification Search ........................ None
See application file for complete search history.

(56) References Cited

U.S. PATENT DOCUMENTS

| | | | |
|---|---|---|---|
| 6,396,783 B1 | 5/2002 | Bell, Jr. et al. | |
| 6,728,050 B2 | 4/2004 | Wilson | |
| 7,256,957 B1 | 8/2007 | Rahgozar | |
| 7,276,902 B1 | 10/2007 | Xiang et al. | |
| 7,405,896 B2 | 7/2008 | Hirano et al. | |
| 7,440,217 B2 | 10/2008 | Ono et al. | |
| 7,450,333 B2 | 11/2008 | Hirano et al. | |
| 7,471,491 B2 | 12/2008 | Sato et al. | |
| 7,616,412 B2 * | 11/2009 | Zhu et al. | 360/324.2 |
| 7,719,786 B1 * | 5/2010 | Baumgart et al. | 360/75 |
| 7,830,634 B2 * | 11/2010 | Chen et al. | 360/75 |
| 2008/0266702 A1 | 10/2008 | Bliss | |
| 2008/0268291 A1 * | 10/2008 | Akiyama et al. | 428/812 |
| 2009/0052095 A1 * | 2/2009 | Yamada et al. | 360/324 |
| 2009/0059418 A1 | 3/2009 | Takeo et al. | |
| 2009/0080109 A1 * | 3/2009 | Fukuzawa et al. | 360/122 |
| 2011/0038080 A1 * | 2/2011 | Alex et al. | 360/123.02 |

FOREIGN PATENT DOCUMENTS

| | | |
|---|---|---|
| JP | 62016282 | 1/1987 |
| JP | 10302202 | 11/1998 |
| JP | 2004012367 | 1/2004 |

OTHER PUBLICATIONS

Jefferson, et al., "Head-Disk Spacing Controller for Magnetic Recording", *IBM Technical Disclosure Bulletin*, (Apr. 1989),240-241.

* cited by examiner

*Primary Examiner* — K. Wong

(57) ABSTRACT

In fly-height control system, a slider comprises a spin torque oscillator that is configured for generating an RF carrier signal which is out-of-band of a frequency band of read data, write data, and control signals in a hard disk drive.

34 Claims, 9 Drawing Sheets

400

```
GENERATE A RADIO FREQUENCY (RF) CARRIER SIGNAL WITH A
SPIN TORQUE OSCILLATOR ON BOARD A SLIDER WHICH IS FLYING
ABOVE A SURFACE OF A DISK IN A HARD DISK DRIVE.
410
```

```
RECEIVE A MODULATED VERSION OF THE RF CARRIER SIGNAL
FROM A PORTION OF THE SLIDER.
420
```

```
DEMODULATE THE MODULATED VERSION OF THE RF CARRIER
SIGNAL TO ACHIEVE A DEMODULATED SIGNAL.
430
```

```
DETERMINE A FLY-HEIGHT OF THE PORTION OF THE SLIDER BY
ANALYZING AN AMPLITUDE OF A RANGE OF FREQUENCIES IN THE
DEMODULATED SIGNAL.
440
```

```
CONTROL THE FLY-HEIGHT OF THE PORTION OF THE SLIDER BY
VARYING A THERMAL FLY-HEIGHT CONTROL (TFC) VOLTAGE TO
THE SLIDER TO ACHIEVE A DESIRED VALUE FOR THE AMPLITUDE.
450
```

```
INJECT A MODULATING SIGNAL INTO THE SLIDER.
415
```

SLIDER FLY-HEIGHT CONTROL IN A HARD DISK DRIVE

BACKGROUND

Hard disk drives are used in almost all computer system operations. In fact, most computing systems are not operational without some type of hard disk drive to store the most basic computing information such as the boot operation, the operating system, the applications, and the like.

Over the years, the disk and the head have undergone great reductions in their size. Much of the refinement has been driven by consumer demand for smaller and more portable hard drives such as those used in personal digital assistants (PDAs), Moving Picture Experts Group audio layer 3 (MP3) players, and the like. For example, the original hard disk drive had a disk diameter of 24 inches. Modern hard disk drives are much smaller and include disk diameters of less than 2.5 inches. Advances in magnetic recording are also primary reasons for the reduction in size.

Modern drives often have very narrow tolerances for components and operation of components. Disk drive sliders are designed to fly in very close proximity to the disk surface. For instance, in some systems the slider may be designed to fly only three to five nanometers above the disk surface. In a system with such close tolerances, components can be subject to van der Waals, Meniscus, electrostatic, spindle motor charge up, and contact potential forces. These forces are due to a variety of causes, such as: the molecular attraction of components in very close proximity; adhesive friction caused by contact between the slider and the lubricant on the disk; the build up of electrical potential between the disk and the slider caused by the rotating disk surface (tribo-charging); the build up of electrical potential in motor bearings (tribo-charging); potential difference (e.g., contact potential difference/difference in work functions) that exists between two different metals (different Fermi levels of slider and disk material); and impacts between the slider and disk surface.

BRIEF DESCRIPTION OF THE DRAWINGS

The accompanying drawings, which are incorporated in and form a part of this specification, illustrate some embodiments of the present invention and, together with the description of embodiments, serve to explain principles discussed below.

FIG. 4 shows a flow diagram of an example method of slider fly-height control in a hard disk drive, according to one embodiment.

Figure 1:
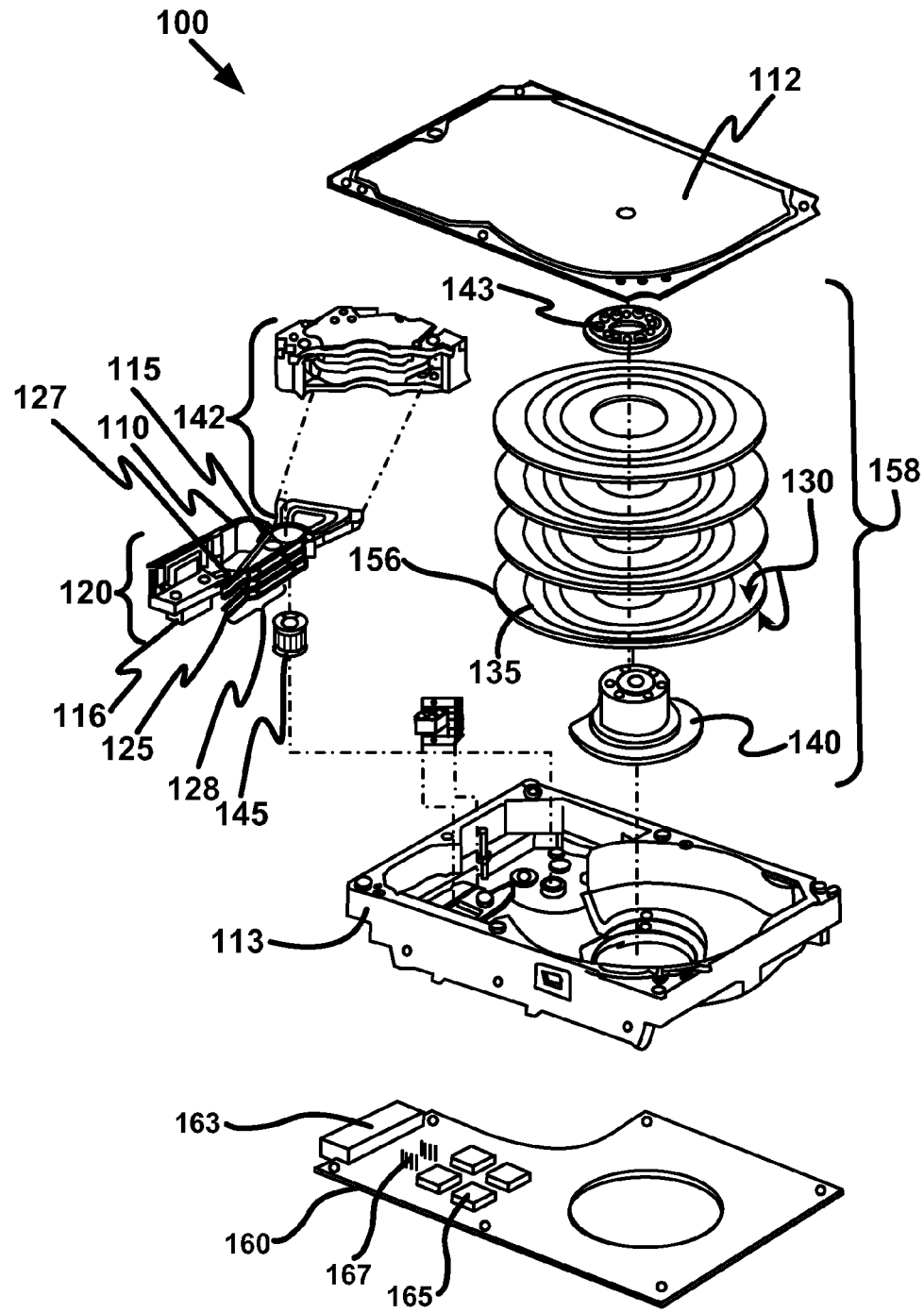
FIG. 1 is an isometric blow-apart of an HDD in accordance with one embodiment.

The drawings referred to in this brief description should be understood as not being drawn to scale unless specifically noted.

DESCRIPTION OF EMBODIMENTS

Reference will now be made in detail to several embodiments of the present invention, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

NOTATION AND NOMENCLATURE

Unless specifically stated otherwise as apparent from the following discussions, it is appreciated that throughout the description of embodiments, discussions utilizing terms such as "generating," "receiving," "demodulating," "determining," "analyzing," "monitoring," "injecting," "detecting," "rewriting," "monitoring," "producing," "varying," or the like, refer to the actions and processes of a hard disk drive (HDD) or portion thereof such as, but not limited to, an application specific integrated circuit (ASIC), hard drive controller, microcontroller, processor, arm electronics (AE) of the HDD, front end electronics (FEE) of the HDD, or similar electronic computing device or combination of such devices used in or with an HDD. For example, the HDD (or some portion(s) thereof) generates, controls, manipulates, and transforms data and signals represented as physical (electronic) quantities within the registers, memories, and/or components of or associated with the HDD (or portion(s) thereof) into other data and signals used or represented in the HDD (or portion(s) thereof) and/or electronic devices associated therewith.

OVERVIEW OF DISCUSSION

Computers have become part of every day life, and as such, expectations and demands continually increase for greater speed for manipulating data, for holding larger amounts of data, while being more compact and consuming less energy. To meet these demands for increased performance, the electromechanical assembly in a computer, specifically the Hard Disk Drive (HDD) has undergone many changes so that more data can be stored in smaller spaces and so that data can be stored and retrieved more quickly and efficiently. One aspect of these changes includes a reduction in the flying height of the head of a slider over the surface of a disk.

As flying heights diminish, it becomes more relevant to accurately control the fly-height of the slider and to quickly detect contact between the slider and the media of the surface of a disk, whenever it happens, to avoid damage to the slider, media, or both. In general, the more accurately slider fly-height can be controlled and the more expeditiously slider-to-disk contact can be detected, the better. Detecting contact allows an action to be taken such as: not lowering a head of the slider further into the media; raising a head of the slider so that the contact is ceased; rewriting data; and/or rereading data. Detecting contact is particularly important in the case of inadvertent contact during a read operation or a write operation, as such contact can cause bouncing vibrations which contribute to errors in data which is read from or written to the media of the surface of a disk. A method and system are described herein which allow for "always on" determination and control of slider fly-height and "always on" detection of slider-to-disk contact by an all electronic means which can be utilized within an HDD. By "always on," what is meant is that the system can operate to determine/control slider fly-height and detect slider-to-disk contact during reading operations, during writing operations, and during a time when the head is idly flying above the surface of a disk.

The methods and systems, as described herein, utilize radio frequency (RF) signal(s) to assist in the contact detection. In particular, an RF carrier signal used in the method(s) and system(s) is generated on board a slider, such as through the use of a spin torque oscillator (STO). In one embodiment, the utilized RF signal(s) operate in frequency band(s) which are not used by the read data, write data, and/or control signals of an HDD in which the method(s)/system(s) is employed.

The discussion will begin with a brief overview of an HDD which comprises a slider fly-height control system (as described herein). Description will also focus on use of this slider fly-height control system for slider-to-disk contact detection in an HDD. An example slider fly-height control system will be described along with some example signal paths within a slider. Spin torque oscillators and some example materials for construction thereof will then be described. Operation of the example slider fly-height control system will then be described in more detail in conjunction with description of an example method of slider fly-height control in an HDD and an example method of slider-to-disk contact detection in an HDD.

EXAMPLE HARD DISK DRIVE

Figure 2:
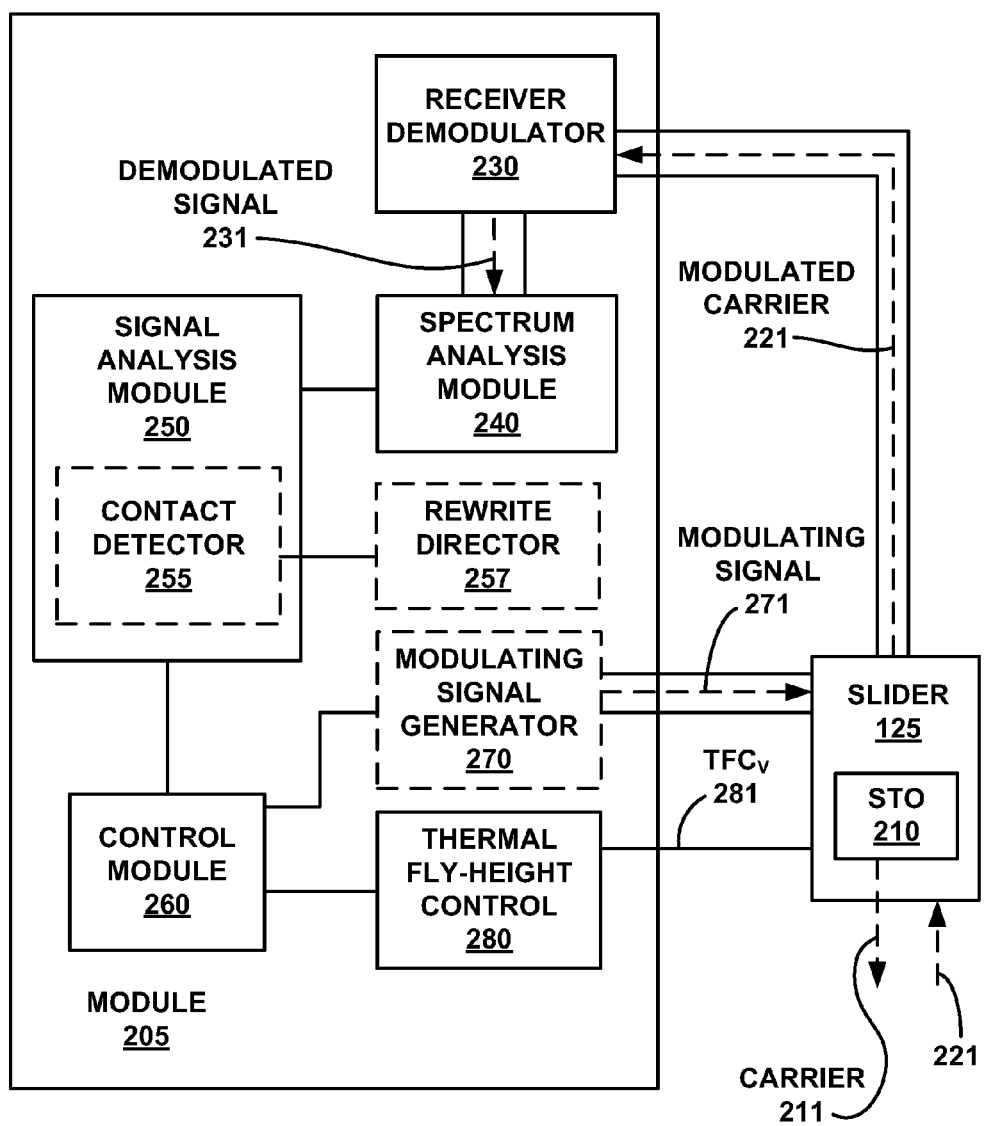
FIG. 2 is an example slider fly-height control system, in accordance with one embodiment.

With reference to FIG. 1, an isometric blow-apart of an example HDD 100 is presented in accordance with an embodiment of the present invention. Base casting 113 provides coupling points for components and sub-assemblies such as disk stack 158, voice coil motor (VCM) 142, and head stack assembly (HSA) 120. Disk stack 158 is coupled with base casting 113 by means of motor-hub assembly 140 and disk clamp 143. Motor-hub assembly 140 will have at least one disk 156 coupled with it such that disk 156 can rotate about an axis common to motor-hub assembly 140 and the center of disk 156. Disk 156 has at least one disk surface 130 upon which reside data tracks 135. HSA 120, at times referred to as an actuator assembly or carriage, comprises suspension 127, which suspends hard disk drive slider 125 next to disk surface 130, and HSA connector 116. Hard disk drive slider 125 includes one or more magnetic transducers or heads which read data from and write data to data tracks 135. Suspension 127 and hard disk drive slider 125 comprise head gimbal assembly (HGA) 128. Flex cable 110, which is part of HSA 120, conveys data between HSA connector 116 and arm electronics (AE) module 115. AE module 115 controls read and write operations, and as described herein, in various embodiments, includes all or portions of module 205 of slider fly-height control system 200 (FIG. 2). HSA connector 116 also conveys control data between printed circuit board (PCB) 160 and VCM 142.

HSA 120 is coupled pivotally with base casting 113 by means of pivot bearing 145, such that VCM 142 can move HGA 128 with slider 125 arcuately across disk surface 130, accessing data tracks 135. Upon assembly of HSA 120, disk stack 158, VCM 142, and other components with base casting 113, cover 112 is coupled with base casting 113 to enclose these components and sub-assemblies into HDD 100.

Once cover 112 is coupled with base casting 113, PCB 160 is coupled to base casting 113. PCB 160 comprises at least one electrical component 165 which in general performs the electrical tasks of HDD 100, such as status check of HDD 100 before writing data, power control for motor-hub assembly 140, and servo control of VCM 142. VCM 142 is electrically coupled with PCB 160 via HSA connector 116 and an appropriately mating connection 167 on PCB 160. Electrical coupling of HDD 100 to a host system in which HDD 100 operates is enabled in part through PCB connector 163, coupled to PCB 160. It is appreciated that PCB 160 and/or electrical component 165 can be configured in other manners and located in other locations, in other embodiments.

The displayed configuration of HDD 100 is shown by way of example and not of limitation. It is appreciated that, in some embodiments, one or more components of HDD 100 can be interchanged or shared between subassemblies while maintaining the spirit of the definitions of the aforementioned assemblies and subassemblies. It is also appreciated that embodiments of fly-height control system 200 can operate, in a similar fashion, with other HDDs besides example HDD 100.

EXAMPLE SLIDER FLY-HEIGHT CONTROL SYSTEM

FIG. 2 is an example slider fly-height control system 200 in accordance with one embodiment. Slider fly-height control system 200 uses radio frequency (RF) signals to assist in slider fly-height control and/or in detecting contact between a slider 125 and surface, such as surface 130, of a disk such as one of disks 156. An RF carrier signal used in system 200 is generated on board the slider with a spin torque oscillator (STO). System 200 is, in one embodiment, "always on" and thus operational during reading, writing, and idling operations involving slider 125. Alternatively, system 200 can be selectively utilized for determining slider fly-height, controlling slider fly-height, and/or detecting slider-to-disk contacts during one or more of reading, writing, or idling of an HDD, such as HDD 100. In various embodiments, a portion of slider fly-height control system 200, such as all or part of module 205, is implemented as a portion of AE module 115, front end electronics, another portion or combination of portions of an HDD (e.g., HDD 100). This can comprise implementation of module 205 within an integrated circuit, such as, for example, an ASIC or an integrated circuit in combination with other integrated circuit(s) and/or discrete components. In some embodiments, system 200 (including module 205 and slider 125) is included in a hard disk drive such as HDD 100. Depending on the method of signal generation (and signal injection in some embodiments) and the frequencies selected, it is appreciated that this system can be operated in an "always on" fashion without interfering with HDD operations. As such, system 200 can determine slider fly-height, control slider fly-height, and/or can detect slider-to-media contact during reading, writing, and/or idling operations of an HDD.

As depicted in FIG. 2, in one embodiment, slider fly-height control system 200 comprises a module 205 and a slider 125 that includes an on board (a component of slider 125) spin torque oscillator 210 for carrier signal generation. In one embodiment, module 205 includes one or more of: a receiver demodulator 230, a spectrum analysis module 240, a signal analysis module 250, a control module 260, and a Thermal Fly-height Control (TFC) 280. In some embodiments, module 205 of slider fly-height control system 200 also comprises one or more of rewrite director 257, contact detector 255, and modulating signal generator 270. It is appreciated that functions of the components of module 205 may be combined or separated in various ways. For example, in one embodiment, contact detector 255 is included as a portion of signal analysis module 250 (as depicted). It is also appreciated that some of the components depicted as part of module 205 may, in some embodiments, be located external to module 205.

Spin torque oscillator 210, in one embodiment, generates an RF carrier signal 211. A separate section below (Discussion of Spin Torque Oscillators) discusses operation and example compositions of some embodiments of spin torque oscillators that are suitable for incorporation in a disk drive slider, such as slider 125. In one embodiment, the RF carrier signal generated by STO 210 is out-of-band above a frequency band of read data, write data, and/or control signals in a hard disk drive, such as HDD 100, in which system 200 is utilized. Consider an embodiment where the read data, write data, and/or control signals of HDD 100 are in the range of approximately 100 MHz to 3.5 GHz. In such an embodiment, STO 210 generates RF carrier signal 211 at a frequency above 3.5 GHz, such as at approximately 4 GHz. Likewise, in another embodiment where the read data, write data, and/or control signals of an HDD are in the range of approximately 100 MHz to 0.75 GHz, STO 210 generates RF carrier signal 211 at a frequency above 0.75 GHz, such as at approximately 1 GHz. Generation of such an out-of-band RF carrier signal does not interfere with the read data, write data, and/or control signals of an HDD, such as HDD 100. In some embodiments, based on the characteristics of a particular HDD and the physical capability of the materials in a particular implementation of STO 210, it is also possible to generate RF carrier signal 211 below the frequency range of the read, write and control signals.

Moreover, modulation of RF carrier signal 211 is taken into account in determining the frequency value of an RF carrier signal. For example if RF carrier signal 211 is to be modulated such that a side band is generated a 200 KHz below RF carrier signal 211, then RF carrier signal 211 is generated at a frequency high enough above the frequency band of read data, write data, and/or control signals that such a lower side band does not fall into the frequency band of the data and control signals or far enough below the frequency band such that an upper side band does not rise into the frequency band of the data and control signals. Because of this "out-of-band" nature, is appreciated that this system can be "always on," without interfering with HDD operations. As it can be always on, system 200 can determine slider fly-height, control slider fly-height, and/or detect slider to media contact whenever it happens (whether during writing or reading or idling). Obviously, it's also important that beyond being "out-of-band", these additional signals for fly height control and contact detection need also to be of amplitudes safe for the HDD components and the details of their signaling. Whether common-mode or differential, these signals need to be also checked for compatibility with HDD signals so that they do not produce unintended writing on the media or other interference with the operation of the HDD.

As depicted in FIG. 2, RF carrier signal 211 is emitted from STO 210 of slider 125. A modulated carrier signal 221 (i.e., a modulated version of carrier signal 211) is then received by one or more portions of slider 125 and transmitted to receiver demodulator 230 of module 205. It is appreciated that, in various embodiments, modulated carrier signal 221 can be conveyed from slider 125 to receiver demodulator 230 over existing common mode read lines (signal lines to the reader head); common mode write lines (signal lines to the writer head); and/or over common mode TFC heater voltage lines. Depending on the amplitude levels of all these signals and compatibility with the HDD system, these signals can also be used in differential mode over existing read, write and TFC lines. Use of such existing lines allows for signal conveyance without adding more signal lines to slider 125 and also allows the modulated carrier signal to be sampled from several locations on slider 125. Sampling the modulated carrier signal 221 from different locations on slider 125 allows for determining and controlling fly-height of different portions of the slider, such as the read element (head) portion, write element (head) portion, and/or TFC heater coil portion.

Receiver demodulator 230 receives modulated carrier signal 221 from slider 125 and demodulates the modulated signal(s), within a particular frequency band of interest, which are modulated onto modulated carrier signal 221. As a result of the demodulation, demodulated signal 231 is produced by receiver demodulator 230. As but one example of the operation of receiver demodulator 230, consider an embodiment where modulated carrier signal 221 is modulated with frequencies of interest which are located in a frequency range which is 100 kHz to 300 kHz above and below RF carrier signal 211. In one such embodiment, demodulated signal 231 comprises demodulation of signals in all or some portion of the range of approximately 300 kHz below and 300 kHz above RF carrier signal 211. It is appreciated that modulated carrier signal 221 can be modulated in the range of such frequencies of interest by natural vibrations of slider 125 during flying operations (e.g., at ~180 kHz to 250 kHz); by electrostatic vibrations induced by modulating signal 271 (e.g., at ~200 kHz or some other frequency); and/or (in a somewhat random fashion) by vibrations induced into slider 125 due to slider-to-disk contact (e.g., in a range between ~200 kHz and ~300 kHz).

Spectrum analysis module 240 produces a signal spectrum of all or some portion of the range of frequencies in the demodulated signal. Spectrum analysis of the range of frequencies produces a signal spectrum comprising amplitude(s) associated with one or more constituent frequencies in the analyzed range of frequencies. In one embodiment, spectrum analysis module 240 utilizes a Fast Fourier transform (FFT) to accomplish the spectrum analysis and production of the signal spectrum in the form of a power spectrum of a plurality of frequencies. In other embodiments, other time domain or frequency domain techniques or signal analysis techniques, such as band pass filtering, can be used to develop the signal spectrum. In one embodiment, spectrum analysis module 240 produces a signal spectrum that includes a tone induced onto modulated carrier signal 221 by a natural modulation of the slider and the resulting natural modulation of the fly height of the slider. In one embodiment, a modulating signal 271 is injected into slider 125 to induce modulation at specific frequencies relative to RF carrier signal 211. Modulating signal 271 is an alternating current signal which induces electrostatic modulation of the slider to disk attraction, and thus modulates the flying height of the slider, which, in turn, results in modulation of RF carrier signal 211. In one embodiment, spectrum analysis module 240 produces a signal spectrum that includes a tone induced onto modulated carrier signal 221 by modulating signal 271. In one embodiment, this tone is at or near 200 kHz, however, the tone may be at other frequencies. For example, in one embodiment, this tone in the range of approximately 100 kHz to 400 kHz. In one embodiment, this tone exists as upper and lower side modulated side bands modulated carrier signal 221.

Signal analysis module 250 analyzes the signal spectrum of the range of frequencies in the demodulated signal for activity indicative of a contact between a head of the slider and a surface of a disk of the hard disk drive. This can comprise monitoring the signal spectrum for an increased or diminished amplitude of a particular frequency (such as the approximately 200 kHz tone), where such a diminishment beyond a certain threshold is indicative of occurrence of contact and other increases or diminishments are related to changes in fly-height. This can additionally or alternatively comprise monitoring the signal spectrum for an augmented amplitude and/or increased richness in energy in a particular frequency range (e.g., between approximately 200 kHz and 300 kHz) or which is also indicative of the occurrence of contact between a head of a slider and a surface of a disk. The increased richness can be evidenced by or demonstrated as an appearance of broadband signal activity in the particular frequency range. By tracking of the amplitude of this tone actual fly-height and/or changes in fly-height of all or a portion (from which a signal sample is received) of the slider can be determined. The analysis can be used as feedback to a fly-height control, such as control module 260 and/or TFC 280, to vary fly-height to keep the amplitude of the tone within a predetermined range or to achieve a particular amplitude of the tone, thus controlling fly-height of the slider.

When included, contact detector 255 operates to detect an occurrence of slider-to-disk contact based upon an occurrence of one or more of the activities that are monitored for by signal analysis module 250. For example, detection of contact can be indicated by contact detector 255 based on the presence of the broad spectrum of increased frequency richness and the substantial diminishment or absence of the above described tone(s). As will become evident, the amplitude of the above described tone(s) generally increases as spacing between slider 125 and disk surface 130 decreases. However, immediately after contact a slider (often) bounces erratically, thus significantly diminishing or eliminating the tone(s) and creating a broad spectrum of modulated noise in the frequency range that is in the vicinity of the tone(s). In one embodiment, contact detector 255 sends a signal to rewrite director 257 in response to detection of slider-to-disk contact.

When included, rewrite director 257 operates to direct a rewrite of all or a portion of data that was in a process of being written when a slider to disk contact even was detected by contact detector 255. In this manner, data loss due to slider-to-disk contact during write operations can be eliminated or reduced. This can comprise rewrite director 257 directing or alerting arm electronics module 115 or some other portion of an HDD that rewriting should be accomplished for data that was being written during a time period when a contact event was detected.

Control module 260, in various embodiments, controls when and whether system 200 is used for slider fly-height control, slider-to-disk contact detection, or some combination. Control module 260 has control over when and whether a modulating signal is generated by modulating signal generator 270. Control module 260, in one embodiment, has control of the frequency of modulating signal 271 (e.g., 100 kHz, 200 kHz, some other frequency, or no frequency) generated by modulating signal generator 270. Control module 260, in one embodiment, has control over whether and what amount of Thermal Fly-height Control (TFC) voltage 281 is generated and applied to a TFC heater coil by TFC 280.

In one embodiment, control module 260 initiates one or more actions based upon contact detector 255 determining occurrence of slider-to-disk contact and/or based upon an amplitude of a tone type signal (e.g., an ~200 kHz sideband of modulated carrier signal 221). An example of such an action is directing TFC 280 to decrease amplitude of or cease the application of TFC voltage 281, such that slider 125 is moved away from contact with a surface 130 of a disk 156. Such an action can be taken in response to detection of contact and/or in response to an amplitude of a measured tone (e.g., an ~200 kHz sideband of modulated carrier signal 221) being above a certain predetermined threshold. Another example of such an action is directing TFC 280 to begin application of or increase the amplitude of the TFC voltage 281 such that slider 125 is moved to a lower fly-height above a surface 130 of a disk 156. Such an action can be taken in response to an amplitude of a measured tone (e.g., an ~200 kHz sideband of modulated carrier signal 221) being below a certain predetermined threshold.

In one embodiment, when included, modulating signal generator 270 generates a modulating signal 271. In one embodiment, modulating signal 271 is out-of-band below the frequency band of read data, write data, and/or control signals in a hard disk drive. Due to being out-of-band and of proper amplitude, this modulating signal 271 does not interfere with read/write/control operations of a slider and head elements or produce any damage to the head elements when it is induced into the body or signal lines of a slider, such as slider 125. Modulating signal generator 270, in one embodiment, operates under the control of control module 260 to generate a modulating signal 271 for injection into slider 125. Modulating signal 271 is an AC (alternating current signal). Modulating signal 271 causes an electrostatic modulation of slider 125 at a fundamental frequency (such as approximately the pitch 2 mode vibration frequency) of slider 125. In one embodiment, a modulating signal 271 of approximately 100 kHz causes an electrostatic modulation of slider 125 at harmonic approximately 200 kHz. This 200 kHz is a harmonic of the 100 kHz modulating frequency and is at or near a fundamental frequency associated with slider 125. In one embodiment, a different modulating signal 271 can be generated. For example, a modulating signal 271 of approximately 200 kHz also causes an electrostatic modulation of slider 125 at approximately 200 kHz if the work function difference between slider and disk is not neutralized. The modulation of slider 125 in this manner causes the fly height of slider 125 to modulate up and down relative to the surface of a disk, such as disk 156.

TFC 280 operates under the control of control module 260 to generate a TFC voltage 281 for application to a heater coil of slider 125. In general, by increasing and decreasing TFC voltage 281 slider a heater coil portion of slider 125 is caused to expand with application or increase application of voltage and contract back to its unexcited size with ceased or decreased voltage. The expansion steps slider 125 closer to surface 130 in a controlled manner, while the contraction steps slider 125 further away from surface 130 in a controlled manner.

EXAMPLES SIGNAL PATHS THROUGH A SLIDER

Figure 3:
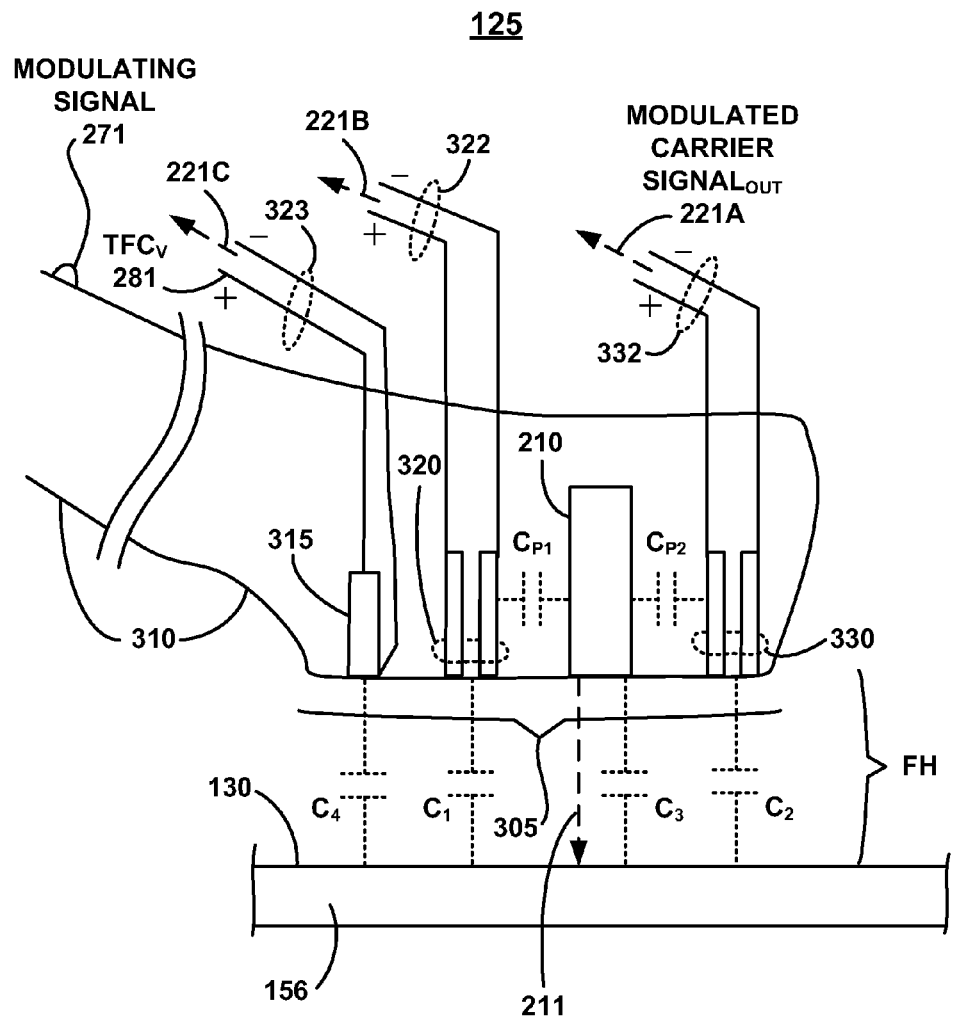
FIG. 3 shows an example of signal paths through a slider, according to various embodiments.

FIG. 3 shows an example of signal paths through slider 125, according to one embodiment. A head region 305 (often generically referred to as the "head" of slider 125) includes read element (head) 320 and write element (head) 330 that are used, respectively, to read data from and write data to disk 156. In operation head region 305 is typically placed in close proximity to disk surface 130 during read and write operations. Moreover, head region 305 is typically located on a portion of a slider (e.g., the trailing edge) which is designed to be in the closest proximity to disk surface 130 during flying operation of slider 125 above disk surface 130. Slider-to-disk or head-to-disk contact as described herein, generally refers to contact between head region 305 and disk surface 130. Contact between head region 305 and disk surface 130 typically causes vibrations and bouncing of slider 125 which may disrupt read or write activities. Contact between head region 305 and disk surface 130 may also cause damage to disk surface 130 and/or to slider 125. Thus, system 200 is used to actively control fly-height and/or to detect slider-to-disk contact between head region 305 and disk surface 130.

With continued reference to FIG. 3, head region 305 also includes spin torque oscillator 210. RF carrier signal 211 is shown being generated by STO 210 and emitted from head region 305 towards disk surface 130. In one embodiment, head region 305 further includes TFC heater coil 315 which can be heated (and made to bulge) in response to application of TFC voltage 281.

RF carrier signal 211 is capacitively coupled from STO 210 to read element 320 via capacitor $C_{P1}$ which is an effective capacitance that exists between STO 210 and read element 320. RF carrier signal 211 is capacitively coupled from STO 210 to read element (read head) 320 via a path from STO 210 through effective capacitor $C_3$ to surface 130 and back through effective capacitor $C_1$ to read element 320. $C_{P1}$ is fixed, while $C_1$ and $C_3$ vary with fly-height modulation. In the path from STO 210 to surface 130 and to read element 320, RF carrier signal 211 becomes modulated into modulated carrier signal 221B, by either natural modulation of slider body 310 or by a modulating signal 271 injected into slider body 310. In one embodiment, modulated carrier signal 221B is conveyed from read element 320 to receiver demodulator 230 via read lines 322 that are also used to convey read data from read element 320 to arm electronics module 115.

RF carrier signal 211 is capacitively coupled from STO 210 to write element 330 via capacitor $C_{P2}$ which is an effective capacitance that exists between STO 210 and write element 330. RF carrier signal 211 is capacitively coupled from STO 210 to write element (also described herein as write head and write coil) 330 via a path from STO 210 through effective capacitor $C_3$ to surface 130 and back through effective capacitor $C_2$ to write element 330. $C_{P2}$ is fixed, while $C_2$ and $C_3$ vary with fly-height modulation. In the path from STO 210 to surface 130 and to write element 330, RF carrier signal 211 becomes modulated into modulated carrier signal 221A, by either natural modulation of slider body 310 or by a modulating signal 271 injected into slider body 310. In one embodiment, modulated carrier signal 221A is conveyed from write element 330 to receiver demodulator 230 via write lines 332 that are also used to convey write data from arm electronics module 115 to write element 330.

RF carrier signal 211 is capacitively coupled from STO 210 to TFC heater coil 315 via a path from STO 210 through effective capacitor $C_3$ to surface 130 and back through effective capacitor $C_4$ to TFC heater coil 315. $C_2$ and $C_4$ vary with fly-height modulation. During the "reflection" from STO 210 to surface 130 and to TFC heater coil 315, RF carrier signal 211 becomes modulated into modulated carrier signal 221C, by either natural modulation of slider body 310 or by a modulating signal 271 injected into slider body 310. In one embodiment, modulated carrier signal 221C is conveyed from TFC heater coil 315 to receiver demodulator 230 via TFC voltage lines 323 that are also used for conveying a TFC voltage 281 to TFC heater coil 315.

It is appreciated that capacitor $C_{P1}$ is not an actual capacitor in the form of a discrete component, but rather is illustrated in FIG. 3 as a model of an effective capacitances that exist between STO 210 and read element 320. Likewise, $C_{P2}$ is a model of an effective capacitance that exists between STO 210 and write element 330. Similarly, $C_1$, $C_2$, $C_3$, and $C_4$ are models of effective capacitances which exist between "plates" disk surface 130 and STO 210, read element 320, write element 330, or TFC heater coil 315. These "plates" are separated by small distances between portions of slider 125 and disk surface 130.

In one embodiment, the modulation of RF carrier signal 211 to produce modulated carrier signal 221 occurs due to the natural vibrations of slider 125 as it flies above surface 130. In one embodiment, such natural vibrations are associated with pitch 2 mode vibrations of slider 125. For example, in one embodiment, such pitch 2 mode vibrations occur at approximately 180 kHz in slider 125 and cause a modulation approximately 180 kHz above and below the frequency of RF carrier signal 211.

In one embodiment, the modulation of RF carrier signal 211 to produce modulated carrier signal 221 occurs due to electrostatic vibrations of slider 125 which are caused by modulating signal 271. In one embodiment, modulating signal 271 causes the slider to vibrate at approximately 200 kHz, thus modulating a signal approximately 200 kHz above and below the frequency of RF carrier signal 211. In one embodiment, modulating signal 271 is injected into slider body 310 as is illustrated in FIG. 3. In other embodiments, modulating signal 271 is injected on one or more existing signal lines (e.g., read lines 322, write lines 332, TFC voltage lines 323, or the like) and/or special purpose signal lines which couple slider 125 with modulating signal generator 270. In embodiments where modulating signal 271 is injected, such as into slider body 310 or on lines other than to the head, existing or additional electrical connections from arm electronics module 115 to slider body 310 are provided for this purpose in the slider and head design. It is appreciated that the modulation of slider 125, either due to natural causes or modulating signal 271, results in a modulation to the fly height (FH) of slider 125 which generates modulated carrier signal 221 from RF carrier signal 211.

In one embodiment, modulated carrier signal 221 is received from read lines 322 (as modulated carrier signal 221B) when reading and from write lines 332 (as modulated carrier signal 221A) when writing. This allows sampling of an appropriate signal to allow the determination and control of the fly-height (FH) of the read element portion of slider 125 when reading and the write element portion of slider 125 when writing. It is appreciated that contact between slider 125 and disk surface 130 can be determined regardless of where modulated carrier signal 221 is sampled.

As illustrated in FIG. 3, in one embodiment, TFC voltage 281 is coupled to TFC heater coil 315 via TFC voltage lines 323. It is appreciated that TFC voltage 281 can be coupled to slider 125 in this fashion even when TFC voltage lines 323 are utilized to couple modulating signal 271 to slider 125 or to convey modulated carrier signal 221C out of slider 125. Additionally, due to modulating signal 271 being out-of-band below the frequencies of read data signals, write data signals, and control signals, modulating signal 271 can be coupled in common mode to slider 125 via read lines 322, write lines 332, or both, without impact to data being read or written over these lines. In addition, those skilled in the art will recognize that differential mode can also be used if signal amplitudes for the fly height control system are compatible with the differential signals already present in the HDD system. Likewise, due to modulated carrier signal 221 being out-of-band above or below the frequencies of read data signals and control signals, modulated carrier signal 221B can be carried to receiver demodulator 230 out via read lines 322 without interfering with read data. Similarly, modulated carrier signal 221A can be carried out to receiver demodulator 230 via write lines 332 without interfering with either write data signals or control signals.

DISCUSSION OF SPIN TORQUE OSCILLATORS

STO 210 as described above is used to generate a microwave range RF carrier signal 211 on board of slider 125. A spin-torque oscillator (STO) is designed to emit a microwave signal generated from the oscillation of magnetization of one of the layers in a magneto-resistive element, such as a current perpendicular to the plane spin-valve utilizing the giant magneto-resistive effect or tunnel valve utilizing the tunnel-magneto-resistive effect. The most simplistic magneto-resistive element comprises at least a magnetic free layer, a spacer layer, and a magnetic pinned layer. Typical spacer layer materials are Cu, Ag, or Au in case of a spin-valve or Mg-oxide, Ti-oxide, or Al-oxide in the case of a tunnel-valve. Typical materials for the pinned and free layer are Co, Fe, or Ni based magnetic alloys. Furthermore, to spatially fix the direction of the magnetization of the pinned layer the pinned layer is typically exchange coupled to an antiferromagnetic pinning layer. While the magnetization of the pinned layer is spatially fixed, the magnetization of the free layer is free to change its direction by rotation or oscillation. Both, the pinned and free layer may comprise a plurality of layers. For example the pinned layer may be an antiparallel coupled pinned layer structure to diminish magneto-static coupling between the pinned layer structure and the free layer. In that case the pinned layer structure comprises a first pinned layer and a second reference layer separated by an antiparallel coupling layer. Typical antiparallel coupling layer materials are Ru, Cr, Ir, or Rh with a thickness chosen to maximize antiparallel coupling strength. For simplicity, regardless of simple or antiparallel pinned structure, here and in the following we call the layer of the pinned layer structure next to the spacer layer the reference layer.

When a direct current I above a certain threshold current $I_c$ is supplied from a power supply and flows perpendicular to the plane of the magneto-resistive element for example with electrons flowing from the pinned to the free layer, the free layer magnetization oscillates by virtue of the spin transfer effect and the angle θ of the free layer magnetization with respect to the reference layer magnetization (which is fixed) varies with time. As the angle θ varies with the oscillation of the free layer magnetization, the device resistance also varies with time due to the giant-magneto-resistive effect in case of a spin-valve or the tunnel-magneto-resistive effect in case of a tunnel-valve, and accordingly a high-frequency voltage is generated. The high-frequency component is extracted for example by a bias tee, so as to obtain a microwave signal as an output.

As mentioned above the direct current I supplied needs to be above the value of the threshold current $I_c$ which depends on the multilayer structure of the magneto-resistive element and in particular on the choice of materials and thickness of the magnetic layers, the current direction, cross-sectional area A, and on the magnetic field acting on the magneto-resistive element. A typical value of the threshold current density is of the order of $10^7$ A/cm². The frequency at which free layer magnetization oscillations occur depends on the choice of free layer thickness of materials, but they typically occur in the >1 GHz regime.

The spin-torque switching effect is described by the Landau-Lifschitz-Gilbert equation:

$$\frac{\partial \hat{m}}{\partial t} = -\gamma(\hat{m} \times \vec{H}) - \alpha\left(\hat{m} \times \frac{\partial \hat{m}}{\partial t}\right) - \frac{\hbar}{2e}\frac{g(\Theta)}{M_S d} j \hat{m} \times (\hat{m} \times \hat{m}_p) \quad \text{Equation (1)}$$

The first term in equation 1 is a precession term, where $\vec{H}$ is the magnetic field vector, which may comprise an internal anisotropy field $H_k$ and an external field $H_e$, the second term is a damping term, where a is the damping parameter of the free layer, and the third term describes spin-torque, where γ is the gyromagnetic constant, d is the thickness of the free layer, j is the electron current density, g(Θ) is the so called Slonczewski term, $\hat{m}$ is the unit magnetization vector of the free layer, $\hat{m}_p$ is the unit magnetization vector of the reference layer, $M_S$ is the saturation magnetization of the free layer, $\hbar$ and e are Plack's constant and electron charge, respectively.

From equation 1 the threshold current density $j_c = I_c/A$, at which magnetic damping and spin-torque contributions are balanced can be derived. Assuming the free and reference layer magnetization are in plane the threshold density is $$j = \frac{2e}{\hbar} \frac{M_S d}{g(\Theta)} \alpha (H_k + 2\pi M_S) \quad \text{Equation (2)}$$

With respect to the techniques described herein, in one embodiment, a goal is to obtain low threshold current $I_c$ and thus in construction of STO 210 free layer materials with low a, $H_K$, $M_S$ are selected in one embodiment. For example, $Ni_{81}Fe_{19}$ is one suitable material, among others, as it exhibits a low a of about 0.01-0.02, a low $M_S$ of about 800 emu/cm³, and a low intrinsic anisotropy filed, $H_K$, of about 1 Oe.

It is appreciated that high spin-polarization materials will also decrease $I_c$ significantly by increasing the value of the Slonczewski term g(Θ), which also depends on the spin-polarization of the ferromagnetic material used in the spin torque oscillator. Moreover, highly spin-polarized materials exhibit low magnetic damping parameters, typically much less than 0.01. Thus the magnetic free layer of a spin torque oscillator, such as STO 210, may be formed of or comprise for example a ferromagnetic Heusler alloy, some of which are known to exhibit high spin-polarization in their bulk form. Full and half Heusler alloys are intermetallics with particular composition and crystal structure. Examples of Heusler alloys include but are not limited to the full Heusler alloys $Co_2(Fe_yMn_{1-y})X$ (where X is one or more of Al, Sb, Si, Sn, Ga, or Ge and y is between 0 and 1), and $Co_2Fe_xCr_{(1-x)}Al$ (where x is between 0 and 1). Examples also include but are not limited to the half Heusler alloys NiMnSb, and PtMnSb. A perfect Heusler alloy will have 100% spin-polarization. However it is possible that in a thin-film form and at finite temperatures, the band structure of the Heusler alloy may deviate from its optimal structure and that the spin polarization will decrease. For example, some alloys may exhibit chemical site disorder and crystallize in the B2 structure instead of the $L2_1$ Heusler structure. Nevertheless, the spin polarization may exceed that of conventional ferromagnetic alloys. Thus, as used herein a "Heusler alloy" shall mean an alloy with a composition substantially the same as that of a known Heusler alloy, and which results in enhanced spin polarization compared to conventional ferromagnetic materials such as NiFe and CoFe alloys.

Other classes of materials that can be used in the formation of a spin torque oscillator, such as STO 210, are those with short spin-diffusion length comparable to the thickness of a typical free layer. Similar to materials with high spin-polarization such classes of materials are effective in scattering spins over a short length scale and thus induce spin-torque instabilities. By way of example, and not of limitation, one such material has a composition of $(Co_xFe_{100-x})_{(100-y)}M_y$, where M is an element selected from the group consisting of Al, Ge and Si and where x is between about 40 and 60 and y is between about 20 and 40. These materials have the advantage of reasonably high spin-polarization and low magnetic damping, which is a desirable characteristic to reduce $I_c$ in a spin torque oscillator, such as STO 210.

Finally it should be noted that spin-torque oscillations also can occur in out-of-plane magnetization systems and, thus, are not limited to in-plane systems. By way of example and not of limitation, the reference layer and free layer may have out-of-plane magnetizations, such as in a Co/Pd or Co/Pt multi-layer.

EXAMPLE METHOD OF SLIDER FLY-HEIGHT CONTROL

FIG. 4 shows a flow diagram 400 of an example method of slider fly-height control in a hard disk drive, according to one embodiment. In one embodiment, this method is used in an "always on" fashion to actively control slider fly-height during reading, writing, and/or idling operations of a hard disk drive such as HDD 100. Method 400 is one example method of use of system 200 of FIG. 2. Reference will be made to FIGS. 1, 2, 3, and 4 and the diagrams of FIGS. 5, and 6 in the description of the method of flow diagram 400.

At 410 of flow diagram 400, in one embodiment, a Radio Frequency (RF) carrier signal is generated with a spin torque oscillator on board a slider which is flying above a surface of a disk in a hard disk drive. As described in conjunction with FIGS. 2 and 3, in one embodiment, this comprises generating RF carrier signal 211 with STO 210 on board slider 125. In one embodiment, the generated RF carrier signal (i.e., RF carrier signal 211) is out-of-band of a frequency band of read data, write data, and/or control signals in the hard disk drive in which the method is being employed.

Figure 5:
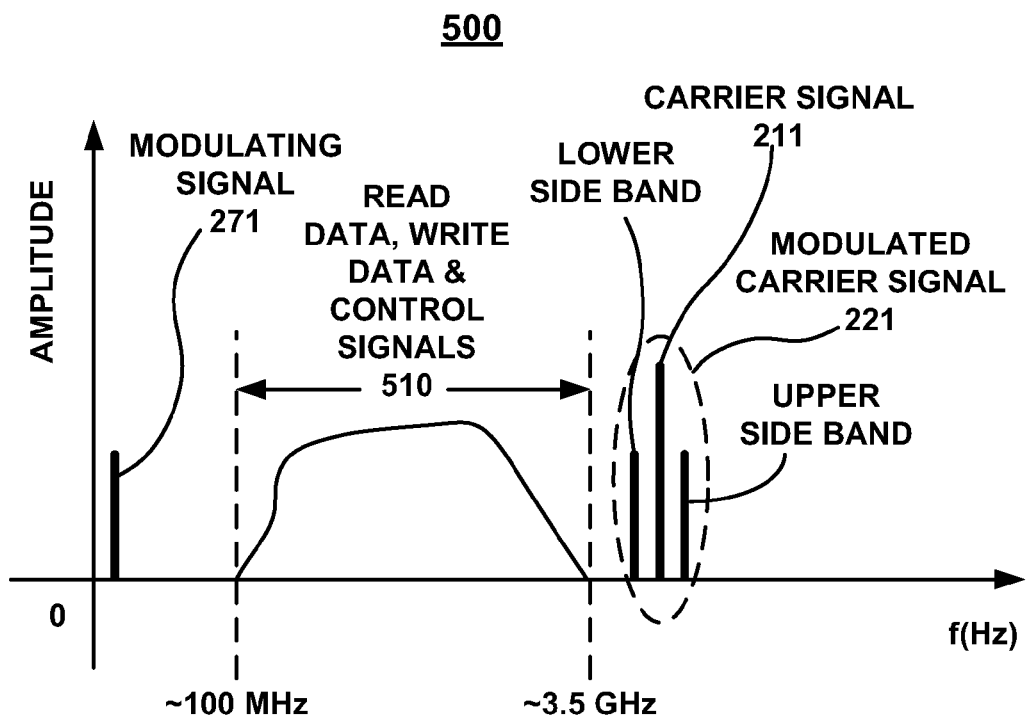
FIG. 5 shows an example of spectrum allocation for out-of-of band signals, according to one embodiment.

FIG. 5 shows an example of spectrum allocation, 500, for out-of-of band signals used according to one embodiment. In FIG. 5, read data, write data, and/or control signals 510 are in the range of ~100 MHz to ~3.5 GHz in a particular HDD, such as HDD 100. As shown, RF carrier signal 211 is at a frequency above the range of signals 510. Additionally, modulated carrier signal 221 (and its first order side bands modulated by modulating signal 271, particularly its lower first order side band) is also above the range of signals 510 while modulating signal 271 is below the range of signals 510. Following the example illustrated by FIG. 5, in one embodiment, RF carrier signal 211 is generated by STO 210 at a frequency such as 4 GHz, which is well above the top end of signal range 510.

At 415 of flow diagram 400, in one embodiment, a modulating signal is injected into the slider. As described in conjunction with FIGS. 2 and 3, in one embodiment, a modulating signal 271 is generated and injected into slider 125. In one embodiment, this comprises modulating signal generator 270 generating and then injecting modulating signal 271 into slider 125. This can comprise injecting modulating signal 271 into the body of slider 125 (i.e., slider body 310) or can comprise injecting modulating signal 271 via signal lines such as one or more of TFC voltage lines 323, read data lines 322, or write data lines 332. In one embodiment, modulating signal 271 is an out-of-band modulating signal that is out-of-band below the frequency band of read data, write data, and/or control signals in the hard disk drive in which the method is being employed.

In one embodiment, modulating signal 271 is injected via a coupling to slider body 310, as illustrated in FIG. 3. Modulating signal 271 can also be injected in a common mode or differential mode fashion into existing or special purpose signal lines that are coupled with slider 125. It is appreciated that, in some embodiments, procedure 415 can be omitted as a slider may have sufficient naturally occurring modulation (e.g., pitch 2 mode vibration) at a particular frequency (e.g., ~200 kHz) to sufficiently modulate RF carrier signal 211 into modulated carrier signal 221, in the fashion disclosed herein.

At 420 of flow diagram 400, in one embodiment, a modulated version of the RF carrier signal is received from a portion of the slider. For example, in one embodiment, this comprises slider fly-height control system 200 receiving modulated carrier signal 221 from a slider, such as slider 125. This can comprise receiver demodulator 230 or some other portion of slider fly-height control system 200 receiving modulated carrier signal 221. Modulated carrier signal 221 comprises a modulated version of injected RF carrier signal 211 which has been modulated by the injected modulating signal 271; by natural oscillations slider 125; and/or by oscillations of slider 125 caused by contact between the slider and the surface of a disk. Both natural and induced oscillations produce modulation of the value of capacitance (e.g., C1, C2, C3, and/or C4) between slider 125 and disk surface 130, which by its turn produces modulation of the RF carrier signal 211 by the modulating signal 271 and/or by the natural modulations of slider 125.

As has been discussed in conjunction with FIG. 3, the modulated carrier signal 221 (e.g. 221A, 221B, 221C, or the like) can be sampled or received from one or more of: the read element portion, the write element portion, the thermal fly-height control portion, and/or some other portion of slider 125. By sampling modulated carrier signal 221 from different portions of slider 125, fly-height of specific portions (where sampled) can be determined and controlled by system 200. Also, it is appreciated that modulated carrier signal 221 can be received from slider 125 via read lines 322, write lines 332, or other signal lines, during the performance of both reading and writing operations with slider 125.

Figure 6:
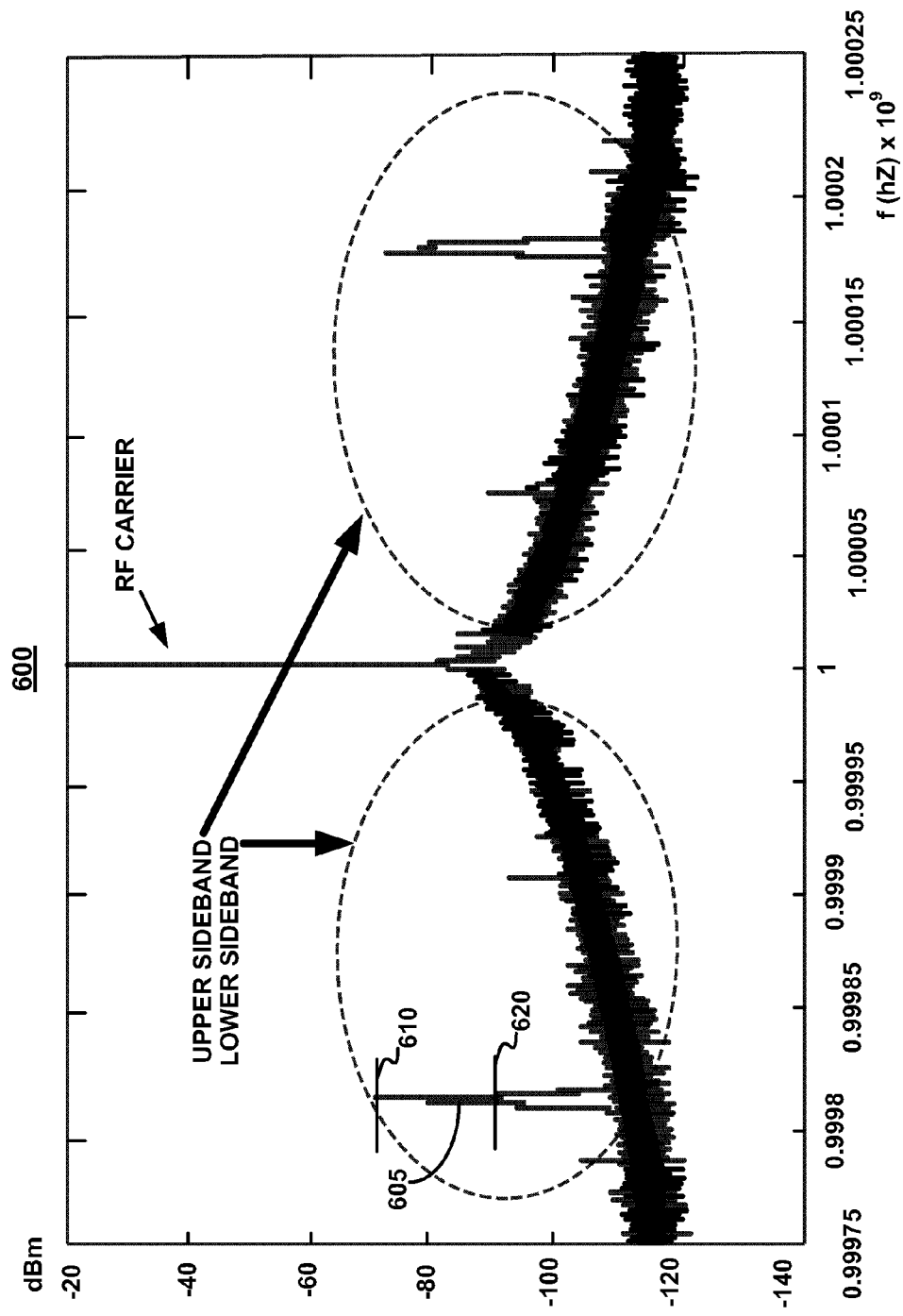
FIG. 6 shows an example of spectrum of a modulated Radio Frequency (RF) carrier signal with modulated upper side bands and lower side bands, according to one embodiment.

FIG. 6 shows an example spectrum of a modulated Radio Frequency (RF) carrier signal with modulated upper side bands and lower side bands, according to one embodiment. In FIG. 6 example representation, 600, shows a spectrum modulation of signals on write lines while a slider (e.g., slider 125) is in flying operation in an HDD, according to one embodiment. Example spectrum modulation representation 600 illustrates an RF carrier (e.g., the carrier portion of modulated carrier signal 221) represented by a spike at ~1 GHz. In one embodiment, the ~1 GHz RF carrier is well above the operating frequency range of read data, write data, and control signals in the particular hard drive in which this RF carrier signal was injected. As described, in other embodiments, modulated carrier signal 221 can be at other frequencies above/below the operating frequency range of read, write, and/or control signals. Consider the example illustrated by FIG. 5 where the carrier frequency is at 4 GHz. It is appreciated that the carrier frequency used may vary between different types/models of hard disk drives depending upon the frequency band of read data, write data, and/or control signals in a particular type/model of hard disk drive. In FIG. 6, a second spike at ~1.0002 GHz represents an upper side band of the modulated RF carrier that has been electrostatically produced by the injection of modulating signal 271 at 100 kHz or 200 kHz. Similarly, a third spike at ~0.09998 GHz represents a lower side band of the modulated RF carrier that has been electrostatically produced by the same modulating signal 271.

At 430 of flow diagram 400, in one embodiment, the modulated version of the RF carrier signal is demodulated to achieve a demodulated signal. In one embodiment, this comprises receiver demodulator 230 demodulating all or some range of a received modulated carrier signal 221 to produce demodulated signal 231. In one embodiment, demodulated signal 231 comprises a range of approximately +300 kHz and/or −300 kHz, from an RF carrier frequency such as modulated carrier signal 221.

In one embodiment, spectrum analysis module 240 produces a signal spectrum of all or a portion of the frequencies of the demodulated signal. For example, in one embodiment, spectrum analysis module 240 produces this signal spectrum by performing a Fast Fourier Transform (FFT) on all or some portion of the demodulated signal 231. The signal spectrum shows the amplitude(s) and frequency/frequencies of the one or more signals which are represented in the signal spectrum. This signal spectrum is provided to signal analysis module 250. FIGS. 6 (and FIGS. 8 and 9 which are described more fully below) provides a visual example of information included in a signal spectrum, in one embodiment.

At 440 of flow diagram 400, in one embodiment, a fly-height of the portion of the slider is determined by analyzing the amplitude of a range of frequencies in the demodulated signal. In one embodiment, signal analysis module 250 performs this analysis. For example, with reference to FIG. 6, this can comprise monitoring the amplitude of a sideband which was demodulated, such as an upper sideband or, as illustrated, lower sideband 605. In one embodiment, for example the goal may be to keep the amplitude between certain thresholds, 610 and 620. Thresholds such as upper threshold 610 and lower threshold 620 can be preset, such as in the factory during the building of an HDD and/or set or revised based upon empirical operational data. For example, empirical operational data or lab/manufacturing testing may indicate that a slider-to-disk contact typically occurs when the amplitude exceeds upper threshold 610 and that reading or writing operations have a lower efficiency when amplitude diminishes below lower threshold 620. As the amplitude of sideband 605 is inversely related to fly-height (until a bouncing contact event occurs), fly-height of a portion of slider 125 from which lower sideband 605 was sampled can be determined from or calibrated with respect to the amplitude of sideband 605 or can be determined to be within a desired range, such as between thresholds 610 and 620. In one embodiment, such calibration can be performed during manufacturing of an HDD. Based on this disclosure, it will be obvious to the skilled in the art that other variations in the functionality and features of the fly height control system can be devised without departing from the spirit of the invention described in this application.

At 450 of flow diagram 400, in one embodiment, the fly-height of the portion of the slider (from which modulated carrier signal 221 is sampled) is controlled by varying a Thermal Fly-height Control (TFC) voltage to the slider to achieve a desired value for the amplitude. In one embodiment, this comprises control module 260 directing TFC 280 to apply or increase TFC voltage 281 in response to fly-height being above a desired level, such as when the side-band amplitude falls below threshold 620. Through feedback, fly-height of the slider can be controlled by adjusting the TFC voltage until a desired value for the amplitude of a tone, such as sideband 605, is achieved. In another embodiment, this comprises control module 260 directing TFC 280 to cease or decrease TFC voltage 281 in response to fly-height being below a level, such as when the side-band amplitude rises above threshold 610.

In some embodiments, it is appreciated that the method of flow diagram 400 also includes performing procedures that allow for detecting instances of slider-to-disk contact and taking actions in response to detection of such contact. Such procedures would be similar or the same as those described in conjunction with flow diagram 700.

EXAMPLE METHOD OF SLIDER-TO-DISK CONTACT DETECTION

Figure 7:
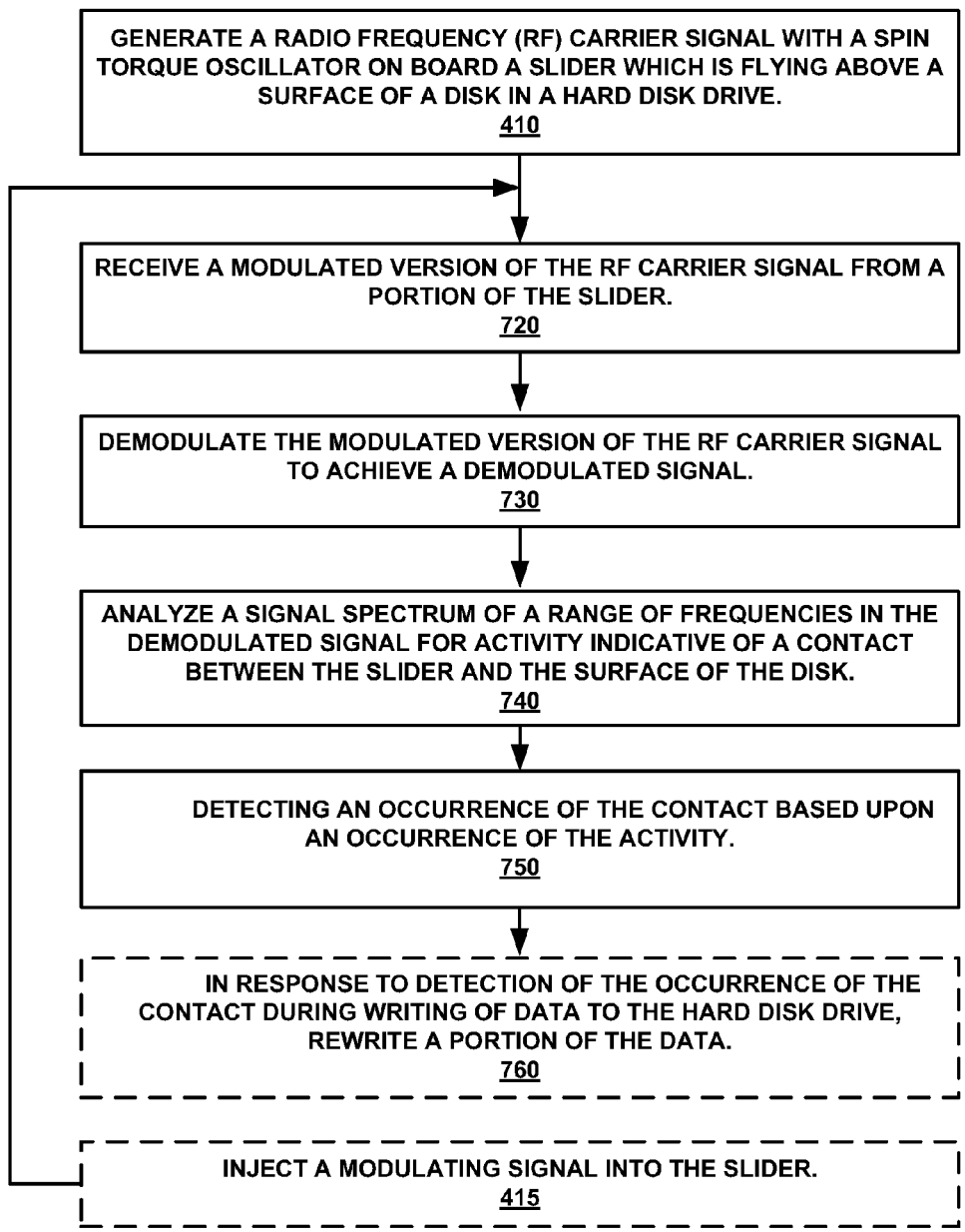
FIG. 7 shows a flow diagram of an example method of slider-to-disk contact detection in a hard disk drive, according to one embodiment.

FIG. 7 shows a flow diagram 700 of an example method of slider-to-disk contact detection in a hard disk drive, according to one embodiment. In one embodiment, this method is used in an always on fashion to detect slider-to-disk contact during reading, writing, or idling operations of a hard disk drive such as HDD 100. Method 700 is one example method of use of system 200 of FIG. 2. Reference will be made to FIGS. 1, 2, and 3, the procedures of flow diagram 400 (FIG. 4) and the diagrams of FIGS. 6, 8, and 9 in the description of the method of flow diagram 700.

At 410 of flow diagram 700, in one embodiment, a Radio Frequency (RF) carrier signal is generated with a spin torque oscillator on board a slider which is flying above a surface of a disk in a hard disk drive. As described in conjunction with FIGS. 2 and 3, in one embodiment, this comprises generating RF carrier signal 211 with STO 210 on board slider 125. In one embodiment, the generated RF carrier signal (i.e., RF carrier signal 211) is out-of-band of a frequency band of read data, write data, and/or control signals in the hard disk drive in which the method is being employed. It is appreciated that this is accomplished in substantially the same manner as 410 of flow diagram 400. In the interests of brevity and clarity reference is made to 410 of flow diagram 400 for further description.

At 415 of flow diagram 700, in one embodiment, a modulating signal is injected into the slider. As described in conjunction with FIGS. 2 and 3, in one embodiment, a modulating signal 271 is generated and injected into slider 125. In one embodiment, this comprises modulating signal generator 270 generating and then injecting modulating signal 271 into slider 125. This can comprise injecting modulating signal 271 into the body of slider 125 (i.e., slider body 310) or can comprise injecting modulating signal 271 via signal lines such as one or more of TFC voltage lines 323, read data lines 322, or write data lines 332. In one embodiment, modulating signal 271 is an out-of-band modulating signal that is out-of-band below the frequency band of read data, write data, and/or or control signals in the hard disk drive in which the method is being employed. Referring again to the example illustrated by FIG. 5, in one embodiment, modulating signal 271 is at a frequency such as 100 kHz or 200 kHz, which is well below the bottom end of signal range 510. Modulating signal 271 causes electrostatic vibrations within a slider such as slider 125.

In one embodiment, modulating signal 271 is injected via a coupling to slider body 310, as illustrated in FIG. 3. Modulating signal 271 can also be injected in a common mode or differential mode fashion into existing or special purpose signal lines that are coupled with slider 125. It is appreciated that, in some embodiments, procedure 415 can be omitted as a slider may have sufficient naturally occurring modulation (e.g., pitch 2 mode vibration) at a particular frequency (e.g., ~200 kHz) to sufficiently modulate RF carrier signal 211 into modulated carrier signal 221, in the fashion disclosed herein. Based on this disclosure, those skilled in the art will recognize that the very occurrence of a slider-to-disk contact may produce random bouncing of the slider which will also modulate the RF signal and will make the modulated carrier appear with broadband lower and upper side bands in its spectrum, as will be discussed with the help of FIG. 9 later in this description of embodiments.

At 720 of flow diagram 700, in one embodiment, a modulated version of the RF carrier signal is received from a portion of the slider. In one embodiment, this comprises receiving a modulated version of the RF carrier signal which has been modulated due to contact between the slider and the surface of the disk. For example, in one embodiment, this comprises slider fly-height control system 200 receiving modulated carrier signal 221 from a slider, such as slider 125. This can comprise receiver demodulator 230 or some other portion of slider fly-height control system 200 receiving modulated carrier signal 221. Modulated carrier signal 221 comprises a modulated version of injected RF carrier signal 211 which has been modulated by: the injected modulating signal 271; by natural oscillations slider 125; and/or by oscillations of slider 125 caused by contact between the slider and the surface of a disk. Both induced, natural, and contact related oscillations produce modulation of the value of capacitance (e.g., C1, C2, C3, and/or C4) between slider 125 and disk surface 130, which by its turn produces modulation of the RF carrier signal 211 by the modulating signal 271, by the natural modulations, or contact induced modulations of slider 125.

As has been discussed in conjunction with FIG. 3, the modulated carrier signal 221 (e.g. 221A, 221B, 221C, or the like) can be sampled or received from one or more of: the read element portion, the write element portion, the thermal fly-height control portion, and/or some other portion of slider 125. Additionally, it is appreciated that modulated carrier signal 221 can be received from slider 125 via read lines 322, write lines 332, and/or other signal lines during the performance of both reading and writing operations with slider 125.

Figure 8:
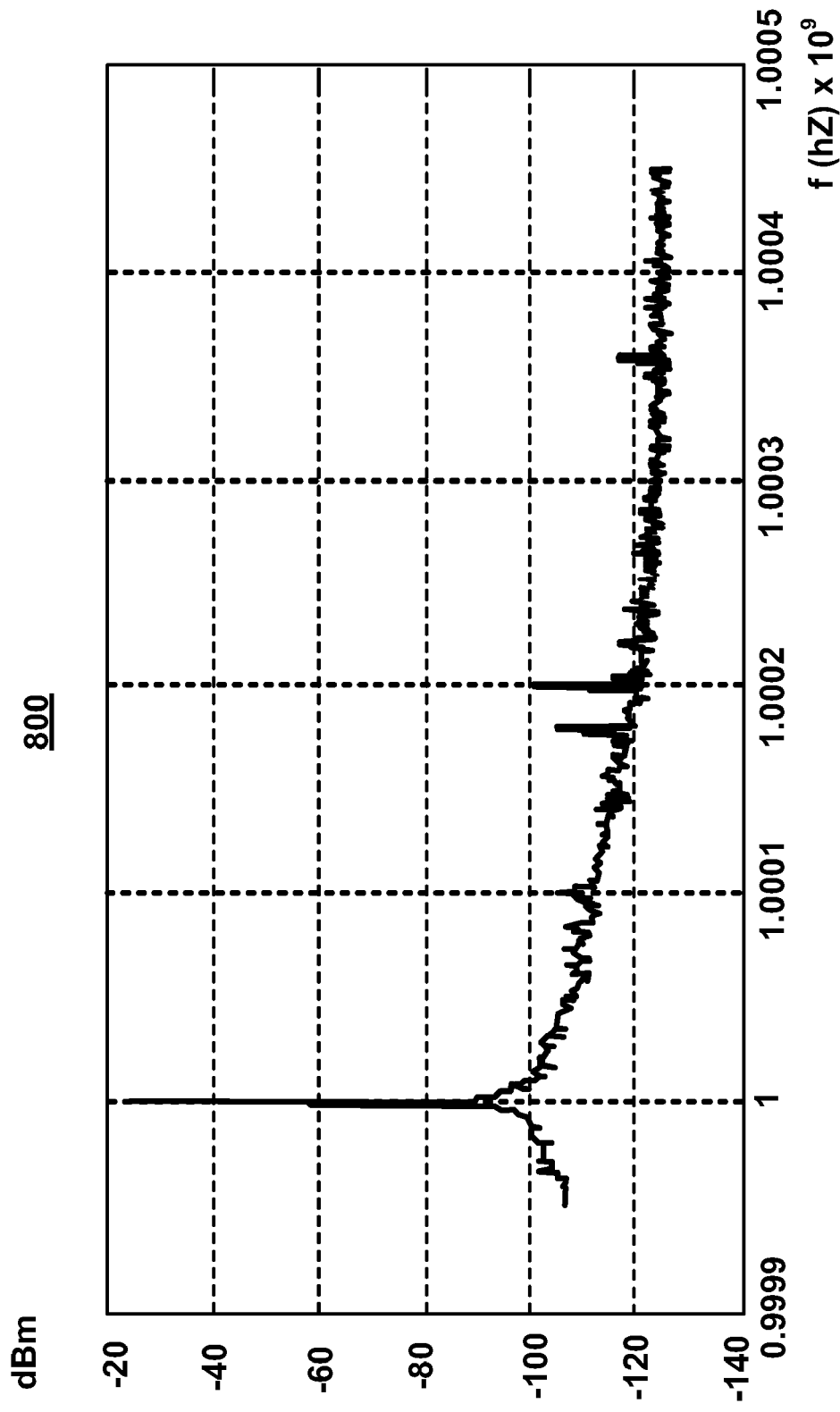
FIG. 8 shows an example of spectrum modulation of signals on write lines prior to slider-to-disk contact, according to one embodiment.

FIG. 8 shows an example 800 of spectrum modulation of signals on write lines prior to slider-to-disk contact, according to one embodiment. Example spectrum modulation 800 illustrates an RF carrier (e.g., the carrier portion, 211, of modulated carrier signal 221) represented by a spike at 1 GHz. The 1 GHz RF carrier is well above the operating frequency range of read data, write data, and/or control signals in the particular hard drive in which the carrier signal was injected. As described, in other embodiments, modulated carrier signal 221 can be at other frequencies above the operating frequency range of read and control signals. Consider the example illustrated by FIG. 5 where the carrier frequency is at 4 GHz. It is appreciated that the carrier frequency used may vary between different types/models of hard disk drives depending upon the frequency band of read data, write data, and/or control signals in a particular type/model of hard disk drive.

With continued reference to FIG. 8, a second spike at ~1.00018 GHz represents modulation induced due to natural vibrations of the slider (e.g., vibrations at 180 kHz). A third spike at 1.0002 GHz represents modulation which has been electrostatically induced by the injection of a modulating signal 271 at 100 kHz or 200 kHz. In an embodiment where procedure 415 is omitted from flow diagram 700, the third modulating spike at 1.0002 GHz will not be present. It is appreciated that FIG. 8 is a representation of modulated carrier signal 221 and its upper side band, and that similar signals would be seen in a representation of the lower side band of modulated carrier signal 221. Such signals for both upper and lower side bands are illustrated in FIG. 6.

Figure 9:
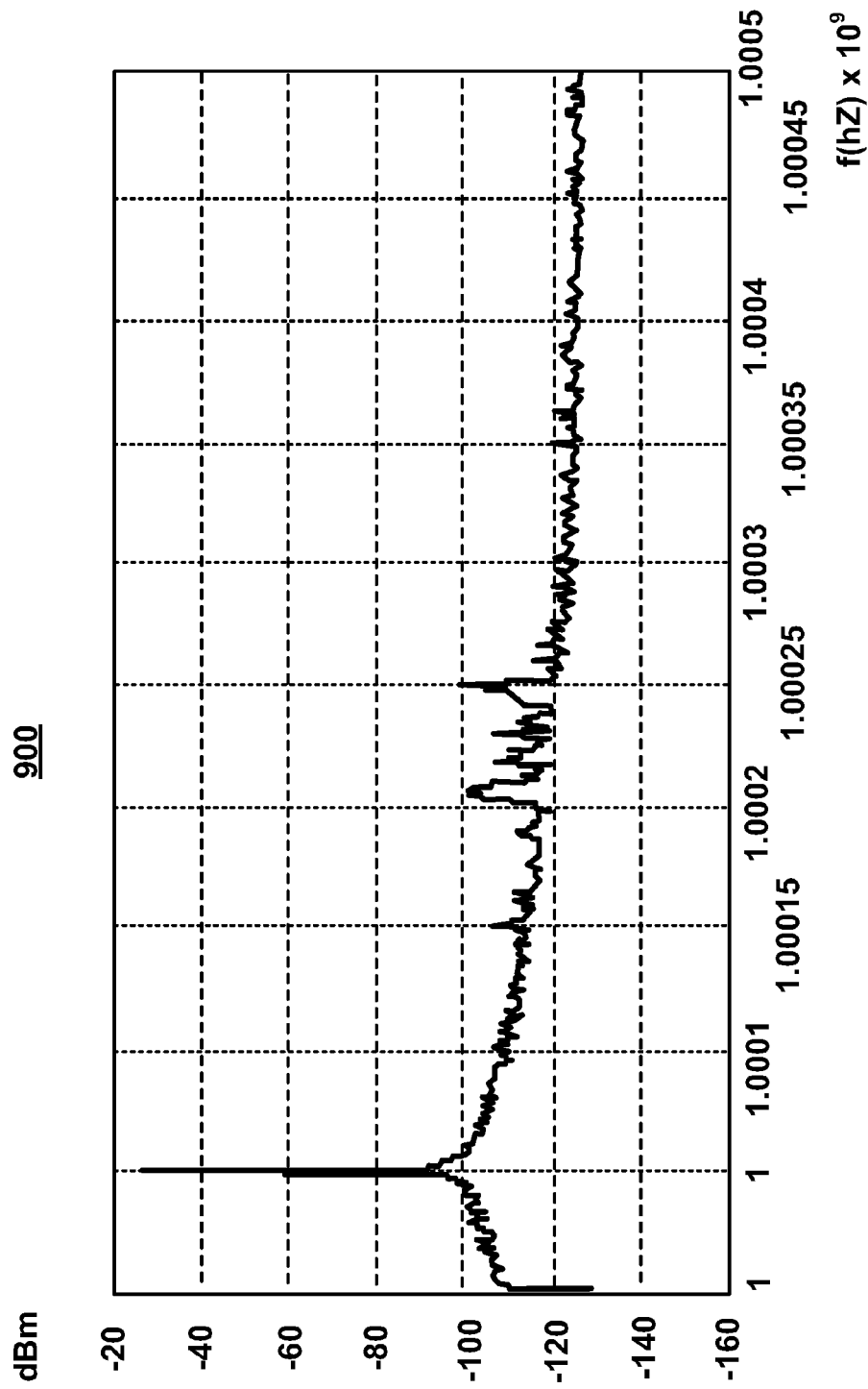
FIG. 9 shows an example of spectrum modulation of signals on write lines at or immediately following slider-to-disk contact, according to one embodiment.

FIG. 9 shows an example 900 of spectrum modulation of signals on write lines at slider-to-disk contact, according to one embodiment. Example spectrum modulation 800 illustrates the modulated carrier signal 221, of FIG. 8, represented by carrier spike at 1 GHz. In a comparison to FIG. 8 it is noted that the modulating spike at 1.00018 GHz has disappeared, as has the modulating spike at 1.0002 GHz. However an increase in frequency response and energy activity is noted in a range between 1.0002 GHz and 1.0025 GHz as compared to FIG. 8. This increase in energy is a result of modulation due to random slider vibrations in the range of 200-250 kHz. These random vibrations were caused by an occurrence of contact between the slider and the surface of a disk. It is appreciated that FIG. 9 is a representation of modulated carrier signal 221 and its upper side band, and that similar signals and response would be seen in a representation of the lower side band of modulated carrier signal 221.

At 730 of flow diagram 700, in one embodiment, the modulated version of the RF carrier signal is demodulated to achieve a demodulated signal. In one embodiment, this comprises receiver demodulator 230 demodulating all or some range of a received modulated carrier signal 221. In one embodiment, demodulated signal 231 comprises a range of approximately +300 kHz and/or −300 kHz from a modulated RF carrier frequency, such as modulated carrier signal 221 which is achieved/produced by this demodulation.

In one embodiment, spectrum analysis module 240 produces a signal spectrum of all or a portion of the frequencies of the demodulated signal. For example, in one embodiment, spectrum analysis module 240 produces this signal spectrum by performing a Fast Fourier Transform (FFT) on all or some portion of the demodulated signal 231. The signal spectrum shows the amplitude(s) and frequency/frequencies of the one or more signals which are represented in the signal spectrum. This signal spectrum is provided to signal analysis module 250. FIGS. 8 and 9 are visual examples of information included in a signal spectrum, in various embodiments.

At 740 of flow diagram 700, in one embodiment, the signal spectrum of a range of frequencies in the demodulated signal is analyzed for activity indicative of a contact between the slider and the surface of the disk. For example, this can comprise contact detector 255 monitoring for a diminished amplitude or absence of a particular frequency within the range of frequencies included in the signal spectrum. This can additionally or alternatively comprise contact detector 255 monitoring for an increase in frequency richness and energy which is associated with a slider-to-disk contact. With reference to FIG. 9, the substantial diminishment/absence of the spikes at 1.0002 GHz and/or 1.00018 GHz, as compared to FIG. 8, is something that is indicative of slider-to-disk contact and which can be monitored for occurrence. Likewise, with reference to FIG. 9, the increased richness and energy of the frequencies in the 1.0002 GHz-1.00025 GHz range, as compared to FIG. 8, is indicative of slider-to-disk contact and can be monitored for occurrence.

At 750 of flow diagram 700, in one embodiment, an occurrence of the slider-to-disk contact is detected based upon an occurrence of the activity for which signal analysis module 250 monitors. Thus, when a monitored for diminishment/absence of a frequency occurs and/or when a monitored for increased in frequency richness and energy occurs, contact detector 255 detects and indicates an occurrence of contact between a slider, such as slider 125, and a disk surface, such as surface 130.

As shown in the plots of FIG. 8 and FIG. 9, the RF signal power is relatively low. Additionally, in some embodiments, the modulated signal being tracked is very close to the carrier frequency. The power of the modulated signal(s) is on the order of −80 to −120 dBm, which is in the range of the signal strength of a typical cellular phone signal. In one example, contact detector 255 has a narrow bandwidth, such as 1 kHz, and is used to detect, for example, the 200 kHz modulating signal. This allows changes in the modulating signal (and therefore slider-to-disk contact) to be detected very quickly. The detection speed is an inverse of the bandwidth frequency of contact detector 255, or 1/1000 of a second (1 mS) in this example. In a current hard drive operating at a speed of, for example, 5400 revolutions per minute, such a system will detect an occurrence of contact in less than 1/10 of a disk revolution. This is much faster than systems which may only work during data readback, and which typically take a time span equivalent to one or more disk revolutions to detect the occurrence of slider-to-disk contact. Furthermore, by increasing bandwidth of contact detector 255 beyond 1 kHz, contact can be detected even more quickly than 1/1000 of a second.

In one embodiment, contact detector 255 sends a signal to control module 260 to indicate detection of slider-to-disk contact. In response, control module 260 takes an action to cause the contact to cease. Such action can include causing TFC 280 to decrease TFC voltage 281. Such action can also include ceasing a reading or writing operation, or repeating a reading or writing operation as a data error may have occurred due to the contact. This is useful during write operations since writing is typically a "blind" operation, i.e., there is no verification of written data following a write in HDDs. During writing in current commercial drives, a contact with the disk, due to asperities or a temporary accumulation of lube in a spot in the disk, may produce write errors that could be easily fixed by rewriting but would only be noticed, possibly irrecoverably, during the next read operation. Removing the blindness to contact during writing allows for noting and fixing write errors during writing.

In 760 of flow diagram 700, in one embodiment, in response to detection of the occurrence of slider-to-disk contact during writing of data to the hard disk drive, a portion of data that was being written during contact is rewritten. In one embodiment, this comprises contact detector 255 alerting arm electronics module 115 or some other portion of the HDD (e.g., HDD 100) when contact is detected. This triggers the HDD to rewrite all or a portion of the data that was being written during the time period that the slider-to-disk contact was detected.

Example embodiments of the present invention are thus described. Although the embodiments of the present invention have been described in a language specific to structural features and/or methodological acts, it is to be understood that the embodiments of the present invention defined in the appended claims are not necessarily limited to the specific features or acts described above. Rather, the specific features and acts described above are disclosed as example forms of implementing the claims.

What is claimed is:

1. A fly-height control system comprising:
   a slider comprising a spin torque oscillator configured for generating an RF carrier signal which is out-of-band of a frequency band of read data, write data, and control signals in a hard disk drive.

2. The fly-height control system of claim 1, further comprising:
   a demodulator configured for demodulating a modulated version of said RF carrier signal to achieve a demodulated signal, said modulated version of said RF carrier signal being received from a portion of said slider;
   a spectrum analysis module configured for producing a signal spectrum of a range of frequencies in said demodulated signal; and
   a signal analysis module configured for analyzing a signal amplitude in said signal spectrum to determine a fly-height change of said portion of said slider, wherein said fly-height change determination of said portion is used for controlling fly-height of said slider.

3. The fly-height control system of claim 2, further comprising:
   a Thermal Fly-height Control (TFC) configured for controlling said fly-height of said portion of said slider by varying a TFC voltage to said slider to achieve a desired value for said signal amplitude.

4. The fly-height control system of claim 2, further comprising:
   a modulating signal generator configured for generating and injecting a modulating signal into said slider, wherein said modulating signal is out-of-band below said frequency band.

5. The fly-height control system of claim 2, wherein said signal analysis module further comprises:
   a contact detector configured for detecting an occurrence of contact between said slider and a surface of said disk based upon an increase in frequency richness demonstrated in said range of frequencies as an appearance of broadband signal activity and energy associated with said contact.

6. The fly-height control system of claim 5, further comprising:
   a rewrite director configured for directing rewriting of a portion data in response to detection of said occurrence of said contact during writing to said hard disk drive.

7. The fly-height control system of claim 1, wherein said spin torque oscillator is a spin-valve.

8. The fly-height control system of claim 1, wherein said spin torque oscillator is a tunnel-valve.

9. The fly-height control system of claim 1, wherein said spin torque oscillator comprises a free or reference layer selected from of one of the group of alloys consisting of a Co, Fe, or Ni based alloy.

10. The fly-height control system of claim 1, wherein said spin torque oscillator comprises a $(Co_xFe_{100-x})_{(100-y)}M_y$ alloy in the free or reference layer, where M is an element selected from the group consisting of Al, Ge and Si.

11. The fly-height control system of claim 1, wherein said spin torque oscillator comprises a $Co_2(Fe_yMn_{1-y})X$ Heusler alloy in the reference or free layer, where X is one or more of Al, Sb, Si, Sn, Ga, or Ge and y is between 0 and 1, or $Co_2Fe_xCr_{(1-x)}Al$ Heusler alloy in the reference or free layer, where x is between 0 and 1.

12. A method of slider fly-height control in a hard disk drive, said method comprising:
   generating a Radio Frequency (RF) carrier signal with a spin torque oscillator on board a slider which is flying above a surface of a disk in a hard disk drive;
   receiving a modulated version of said RF carrier signal from a portion of said slider;
   demodulating said modulated version of said RF carrier signal to achieve a demodulated signal; and determining a fly-height change of said portion of said slider by analyzing an amplitude of a range of frequencies in said demodulated signal, wherein said fly-height change determination of said portion is used for controlling fly-height of said slider.

13. The method of claim 12, further comprising,
controlling said fly-height of said portion of said slider by varying a Thermal Fly-height Control (TFC) voltage to said slider to achieve a desired value for said amplitude.

14. The method as recited in claim 12, further comprising:
injecting a modulating signal into said slider.

15. The method as recited in claim 12, wherein said receiving a modulated version of said RF carrier signal from a portion of said slider comprises:
receiving said modulated version of said RF carrier signal from a read element portion of said slider.

16. The method as recited in claim 12, wherein said receiving a modulated version of said RF carrier signal from a portion of said slider comprises:
receiving said modulated version of said RF carrier signal from a write element portion of said slider.

17. The method as recited in claim 12, wherein said receiving a modulated version of said RF carrier signal from a portion of said slider comprises:
receiving said modulated version of said RF carrier signal from said portion of said slider during both reading and writing operations performed with said slider.

18. A method of slider-disk contact detection in a hard disk drive, said method comprising:
generating a Radio Frequency (RF) carrier signal with a spin torque oscillator on board a slider which is flying above a surface of a disk in a hard disk drive;
receiving a modulated version of said RF carrier signal from said slider;
demodulating said modulated version of said RF carrier signal to achieve a demodulated signal;
analyzing a signal spectrum of a range of frequencies in said demodulated signal for activity indicative of a contact between said slider and said surface of said disk; and
detecting an occurrence of said contact based upon an occurrence of said activity.

19. The method as recited in claim 18, further comprising:
in response to detection of said occurrence of said contact during writing of data to said hard disk drive, rewriting a portion of said data.

20. The method as recited in claim 18, further comprising:
injecting a modulating signal into said slider.

21. The method as recited in claim 20, wherein said receiving a modulated version of said RF carrier signal from said slider comprises:
receiving said modulated version of said RF carrier signal which has been modulated by said modulating signal.

22. The method as recited in claim 20, wherein said analyzing a signal spectrum of a range of frequencies in said demodulated signal for activity indicative of a contact between said slider and said surface of said disk comprises:
monitoring said signal spectrum for an augmented or diminished amplitude of a particular frequency within said range of frequencies, said particular frequency being associated with said modulating signal; and
monitoring said signal spectrum for an increase in frequency richness demonstrated as an appearance of broadband signal activity and energy associated with said contact.

23. The method as recited in claim 18, wherein said receiving a modulated version of said RF carrier signal from said slider comprises:
receiving said modulated version of said RF carrier signal which has been modulated due to said contact between said slider and said surface of said disk.

24. A hard disk drive comprising:
a disk comprising a surface for magnetic storage of data; and
a radio frequency (RF) fly-height control system including a slider comprising a spin torque oscillator configured for generating an RF carrier signal which is out-of-band of a frequency band of read data, write data, and control signals in a hard disk drive.

25. The hard disk drive of claim 24, wherein said RF fly-height control system further comprises:
a demodulator configured for demodulating a modulated version of said RF carrier signal to achieve a demodulated signal, said modulated version of said RF carrier signal being received from a portion of said slider;
a spectrum analysis module configured for producing a signal spectrum of a range of frequencies in said demodulated signal;
a signal analysis module configured for analyzing a signal amplitude in said signal spectrum to determine a fly-height change of said portion of said slider, wherein said fly-height change determination of said portion is used for controlling fly-height of said slider; and
a Thermal Fly-height Control (TFC) configured for controlling said fly-height of said portion of said slider by varying a TFC voltage to said slider to achieve a desired value for said signal amplitude.

26. The hard disk drive of claim 25, wherein said RF fly-height control system further comprises:
a modulating signal generator configured for generating and injecting a modulating signal into said slider, wherein said modulating signal is out-of-band below said frequency band.

27. The hard disk drive of claim 25, wherein said signal analysis module further comprises:
a fly-height detector configured for detecting an occurrence of contact between said slider and a surface of said disk based upon an increase in frequency richness demonstrated in said range of frequencies as an appearance of broadband signal activity and energy associated with said contact.

28. The hard disk drive of claim 25, wherein said RF fly-height control system further comprises:
a rewrite director configured for directing rewriting of a portion data in response to detection of occurrence of said contact during writing to said hard disk drive.

29. The hard disk drive of claim 25, wherein said portion of said slider is selected from the slider portions consisting of:
a read element portion, a write element portion, and a TFC heater coil portion.

30. The hard disk drive of claim 24, wherein said spin torque oscillator is a spin-valve.

31. The hard disk drive of claim 24, wherein said spin torque oscillator is a tunnel-valve.

32. The hard disk drive of claim 24, wherein said spin torque oscillator comprises a free or reference layer selected from of one of the group of alloys consisting of a Co, Fe, or Ni based alloy.

33. The hard disk drive of claim 24, wherein said spin torque oscillator comprises a $(Co_xFe_{100-x})_{(100-y)}M_y$ alloy in the free or reference layer, where M is an element selected from the group consisting of Al, Ge and Si.

34. The hard disk drive of claim 24, wherein said spin torque oscillator comprises a $Co_2(Fe_yMn_{1-y})X$ Heusler alloy in the reference or free layer, where X is one or more of Al, Sb, Si, Sn, Ga, or Ge and y is between 0 and 1, or $Co_2Fe_xCr_{(1-x)}Al$ Heusler alloy in the reference or free layer, where x is between 0 and 1.

* * * * *